Patented Aug. 28, 1928.

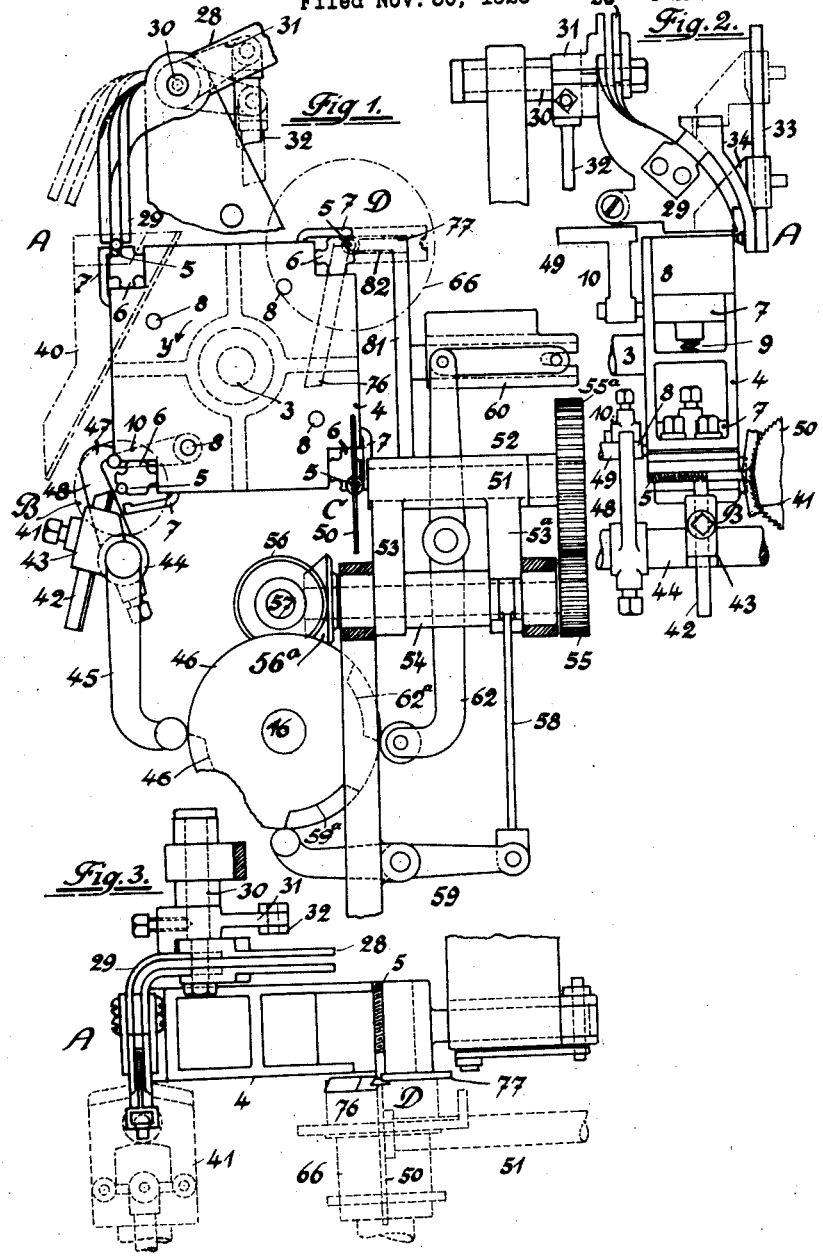

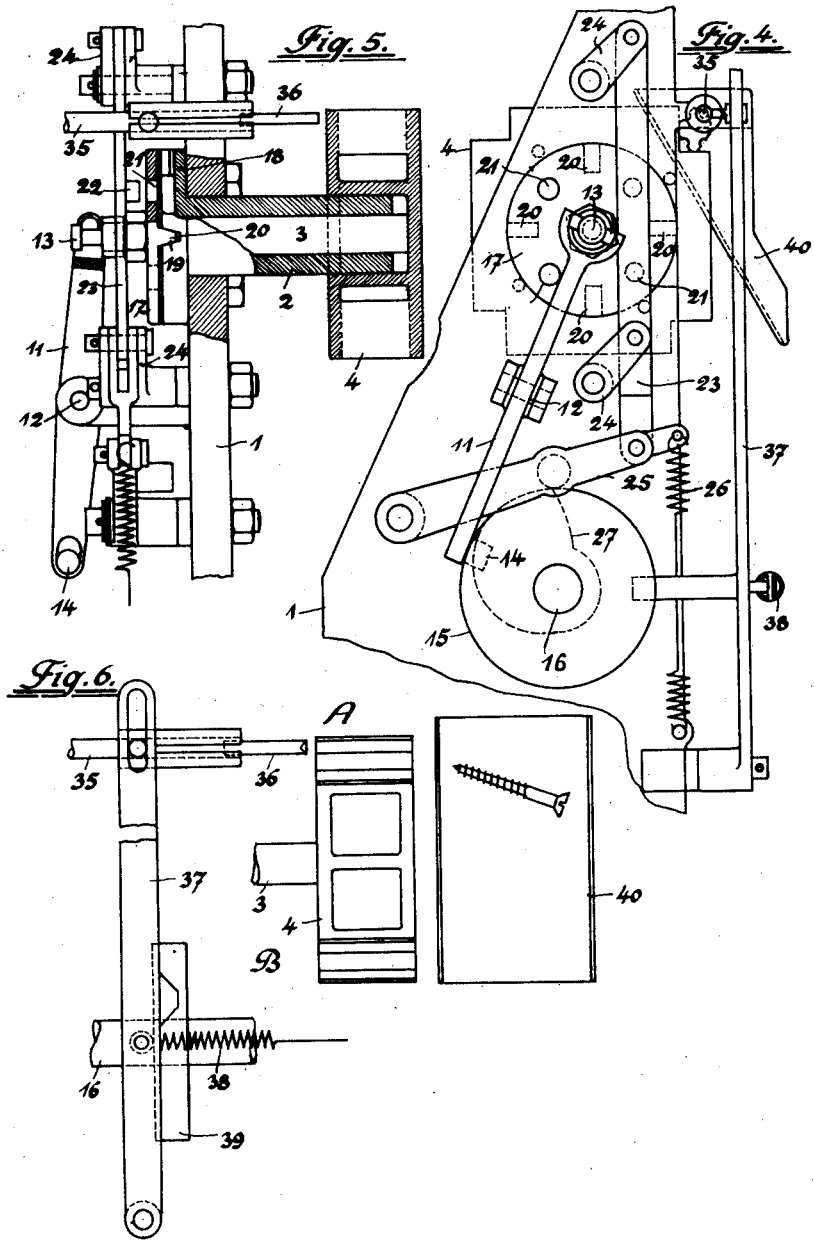

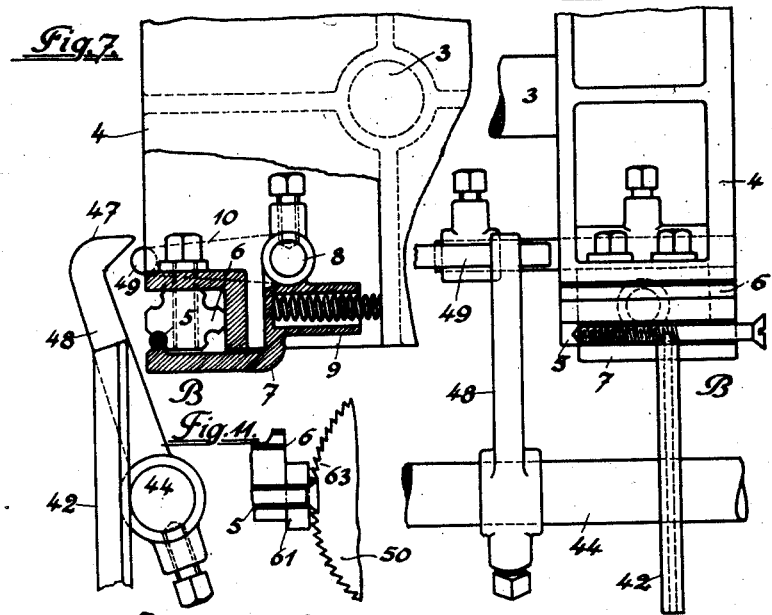
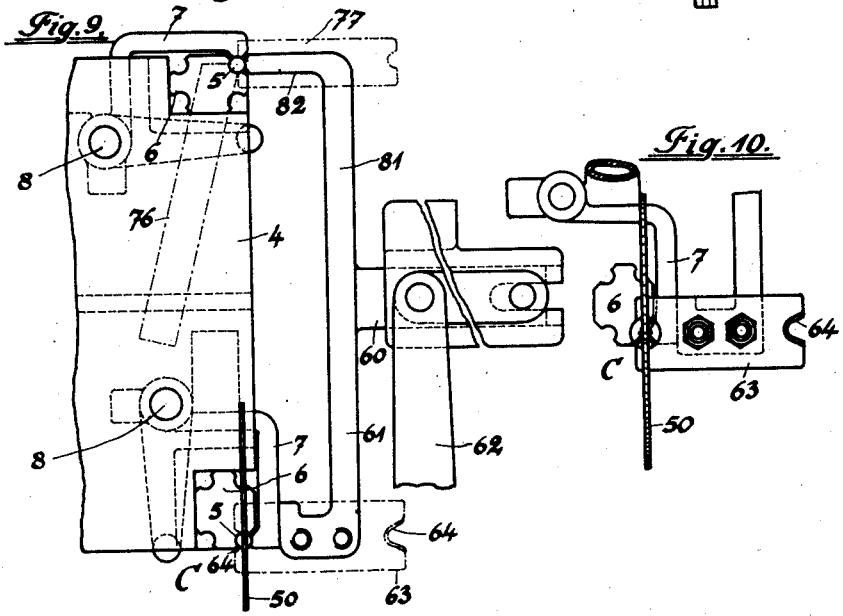

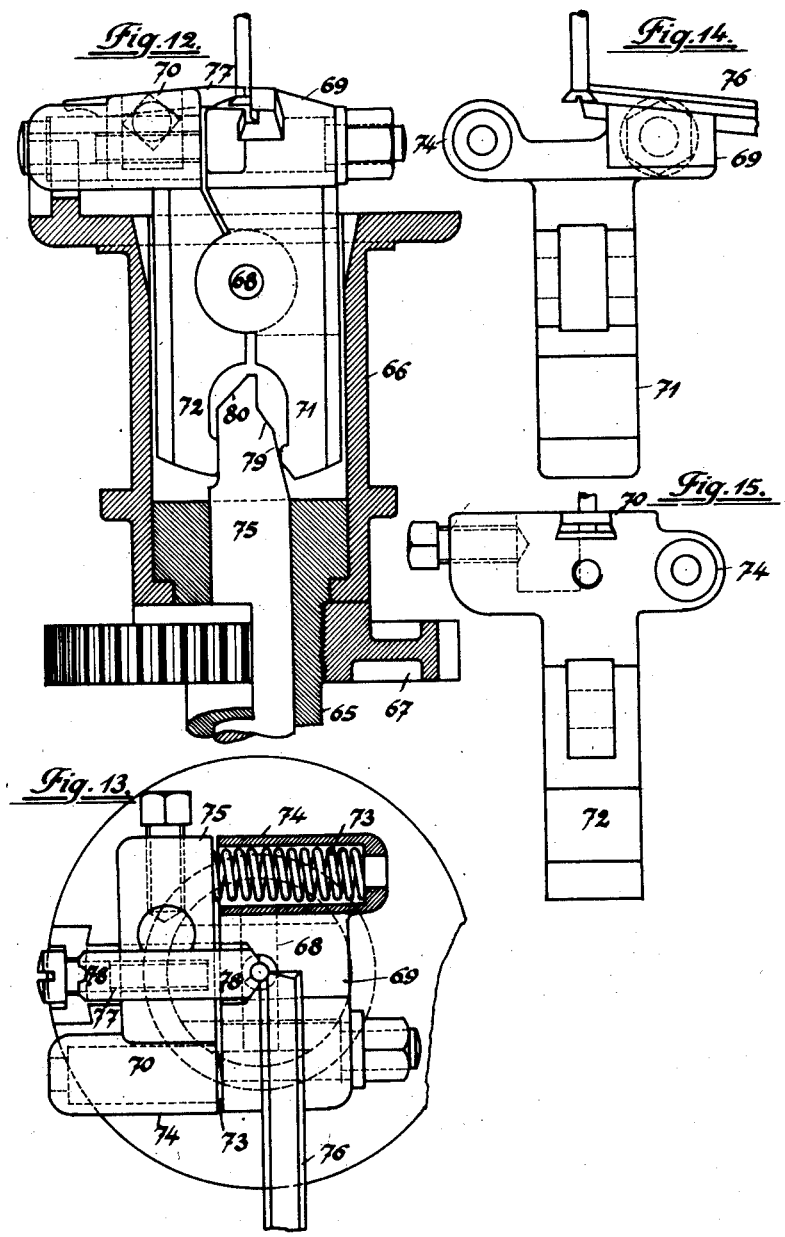

1,682,646

UNITED STATES PATENT OFFICE.

GUSTAV WEBER, OF COLOGNE-ON-THE-RHINE, GERMANY.

MACHINE FOR PRODUCING WOOD SCREWS FROM PRESSED BLANKS.

Application filed November 30, 1925, Serial No. 72,253, and in Germany October 28, 1924.

This invention relates to a machine for the production of wood screws from pressed blanks by slitting the bolt head, turning off of the head surfaces and cutting of the thread in the shaft. According to the invention the works are each successively conveyed to the tools arranged on a circle by means of a stepwise rotating work holder which is stopped after every rotation and which has in its circumference grooves which extend parallel to the axis of rotation of the work holder and which are designed to receive the works so that while the work holder is stopped a groove containing a work stands opposite a working point, another groove facing the mouth of a channel for feeding the works. The different tools are arranged with regard to the direction in which the work holder rotates in such succession that first the thread is cut into the shaft, whereupon the slit is produced in the head and finally the front and rear head faces are turned off. The invention is further characterized in that the works are at the turning off of the head faces submitted to the treatment by rotating tools, the work holder being at stand still. The machine comprises rotating tongs which grip around the works into which the thread has to be cut and rotate said works, a circular saw for slitting the bolt heads, and a rotating tool head in which the turning tool is or the turning tools are mounted. The rotatable work holder is shiftable in axial direction and after every part rotation it is advanced towards the tongs, the saw and the tool head in order to insert the head end of one work into the rotating tongs, the head of the other work into the range of the saw and the head of a third work into the range of the turning tool or turning tools, whilst it is withdrawn from the tongs, saw and tool head prior to every new part rotation. At the advancing movement of the work holder the shafts of the works remain in the grooves of the work holder so that the tool holder does not only serve as conveyer but at the same time to support the shaft of the one work during the cutting of the thread, and to securely hold the two other works which are to be slitted or to be turned off. This is possible as not the work to be turned off but the turning tools rotate. It is evident that in this manner the construction and operation of the machine is considerably simplified. Besides the different tools and the necessary tongs for rotating the works at the thread cutting only one work holder is required which serves at the same time as conveyer, as abutment for the works into which the thread has to be cut and as holding device for the works at the cutting of the slit and at the turning off. Owing to the fact that the thread has been cut into the works before the slit is produced and the head is turned off the advantage is obtained that the works, at the cutting of the thread, may be gripped by the rotatable tongs over the entire length of the head without any danger of deformation or damaging of the head whereby, on the one hand, a secure holding is ensured and, on the other hand, the construction of the mouth of the tongs is simplified. Another advantage is that impressions made by the tongs into the bolt head disappear at the subsequent turning off.

An embodiment of the invention is shown, by way of example, on the accompanying drawing in which Figs. 1 to 4 show respectively in end elevation, side elevation, plan view and rear elevation the principal elements of the new machine.

Fig. 5 shows in side elevation the elements situated on the rear side of the machine, the work holder being shown in vertical section.

Fig. 6 shows in side elevation the mechanism for delivering the finished works.

Figs. 7 and 8 show respectively in front elevation partly in section and in side elevation the thread cutting mechanism and the adjacent part of the tool holder.

Fig. 9 shows in front elevation a mechanism for the positive clamping of the works in the grooves of the work holder which works stand actually in front of the circular saw and of the tool head which carries the turning tool.

Figs. 10 and 11 show respectively in front elevation and in side elevation a special mechanism for supporting the bolt head at the cutting of the slit.

Fig. 12 is a longitudinal section through the rotating tool head for the turning off of the head faces.

Fig. 13 is an end view of Fig. 12 partly in section.

Figs. 14 and 15 show the arms of the tongs mounted in this tool head in views seen from the inside. Figs. 7 to 15 are drawn on larger scale than Figs. 1 to 6.

On the vertical wall of the machine frame a bearing 2 for a vertical shaft 3 is fixed, said shaft 3 carrying a work holder 4 on its end situated in the front end face of the machine. This work holder 4 is composed of two square end walls connected with one another by a hub and by four radial walls. The work holder is consequently essentially of the shape of a four-sided prism with cavities. A groove 5 parallel to the axis of the work holder 4 is arranged on each of the four corners of the work holder said grooves being designed to receive the shafts of the blanks to be worked. These grooves 5 are preferably arranged not directly on the work holder 4, but, in a manner known per se, in fitted blocks 6 removably mounted in cut out portions of the work holder. For holding the works in the grooves 5 of the work holder 4 clamping elements are mounted on said work holder said clamping elements consisting of angle levers 7, keyed on a shaft 8 journalled in the end faces of the holder 4, said levers 7 being acted upon by pressure springs 9 so that noses at the free ends of said levers are pressed from the side against the work in the groove 5. This work is thus clamped between the lever 7 and the opposite wall of the groove (Figs. 7 and 9). On each of the shafts 8 which carry the clamping elements a lever 10 is mounted which, co-operating with a central lever which will be hereinafter described and is mounted outside the work holder 4, serves to lift the clamping element 7 off the work so that this work can freely rotate in the groove of the work holder. Shaft 3 of the work holder 4 is, together with the work holder, not only rotatably mounted on the bearing 2 but also capable to move in axial direction within certain limits. The axial displacement of shaft 3 is effected by a two-armed lever 11 pivotally mounted on a stationary pivot pin 12. The one arm of this lever 11 is coupled with shaft 3 by means of two rollers engaging with an annular groove of an extension 13 at the rear end of shaft 3, the other arm of said lever 11 carrying a roller 14, which, by the action of a spring not shown, is pressed on an axial cam disk 15 keyed on the control shaft 16 of the machine. Shaft 3 carries on its end turned away from the work holder 4 a disk 17 which serves at the same time for locking the work holder 4 and as feed disk for the intermittent rotation of said work holder. With this object in view disk 17 has, on the one hand, a locking cam 19 on its surface facing the flange 18 of the bearing 2, said cam 19 engaging, according to the position of the work holder 4 with the one or other of four notches 20 arranged in the flange 18 of the bearing and displaced 90° the one with regard to the other, and, on the other hand, said disk 17 has four holes 21 arranged on a circle and displaced 90° with regard to one another and designed to receive a feed pin 22 mounted on a feed rod 23 shiftable transversely to shaft 3. The feed rod 23 is guided by two links 24 the length of which is equal to the radius of the circle on which the holes 21 are arranged in disk 17. The feed rod 23 is hingedly connected at the lower end on a one-armed roller lever 25 the roller of which is pressed by the action of a spring 26 against the cam face of a cam disk 27 keyed on the control shaft. In the front end position of the work holder 4 and of shaft 3 shown in Fig. 5 the cam 19 of disk 17 engages with a notch 20 of the flange 18 of the bearing 2 and locks thus the work holder 4 against accidental rotation. If the work holder has to be rotated it is moved through the intermediary of lever 11 and cam disk 15 into its rear end position, e. g. in Fig. 5 shifted to the left, so that, on the one hand, cam 19 is disengaged from notch 20 of flange 18, and, on the other hand, the feed pin 22 on feed rod 23 is brought into engagement with the hole 21 of disk 17 which stands opposite said pin. The feed rod 23 is depressed by the action of spring 26 as the roller lever 25 rolls off the cam portion of disk 27 of such a distance that the feed disk 17 and with it the work holder 4 are rotated 90°. After this rotation shaft 3 with work holder 4 is advanced (e. g. shifted to the right in Fig. 5) so that the feed pin 22 disengages from the hole 21 of disk 17 while cam 19 engages again with notch 20 of flange 18 of the bearing 2 and locks the shaft 3 and the work holder 4. The feed rod 23 can be brought back into the initial position by the action of the cam disk 27.

At the stepwise, intermitted rotation of the work holder 4 as described the grooves 5 in the four corners of the work holder move on a circle concentric to shaft 3. On this circle a feeding point A and three working points B, C and D are arranged at 90° the one to the other so that when the work holder 4 stops a groove 5 stands in front of each of the points A to D. The fresh works supplied at point A are brought by the stepwise rotation of the work holder 4 successively to the three work-points B, C and D and are there submitted to the action of the tools whereupon they get back to point A to be discharged.

At point A a feeding and a delivering mechanism must be arranged. The feeding mechanism (Figs. 1–3) consists of an incline 28 terminating from above over the groove 5 of the work holder 4 which is in front of A. The lower end 29 of the incline is hingedly connected with the upper portion of the incline so that it can pivot around an axle 30 to be raised into the position indicated in Fig. 1 in mixed lines, this being necessary in order to rotate the work holder 4 so that the finished work can be delivered at point A. The portion 29 of the incline is operated in the one direction by the action of a spring through the intermediary of a lever arm 31 and a connecting rod 32, and in the other direction by a cam disk not shown, which is keyed on the control shaft 16. If a work has to be fed from the incline 28 into the work holder 4, the end 29 of the incline is brought into the position shown in Figs. 1 and 2 in full lines, the bolt or work held at first at the hinge of the incline slipping down to the end of the incline. In order to bring the bolt shaft into the groove 5 of the work holder 4, which is partly closed by the spring controlled clamping element 7, a finger 34 is movably mounted on a vertical rod 33 and operated by a convenient lever system from a cam disk. This finger 34 is lowered as soon as the end of the incline stands over the groove 5; the finger engages with the portion 29 of the incline and presses the bolt shaft of the lowest work into the groove 5 in pushing the element 7 to the side whereupon the work is held by this clamping element.

The delivering mechanism consists of a rod 35 (Figs. 4–6) guided parallel to the shaft 3 of the work holder 4, said rod 35 being shiftably guided at the point A coaxial to the bolt held in the groove of the work holder 4 facing the point A. The rod 35 carries on its end facing the work holder 4 an exchangeable ejecting pin 36. Rod 35 is coupled by pin and slot with a roller lever 37, the roller of which is pressed by the action of a spring 38 on an axial cam disk 39 keyed on the control shaft 16. Each time when the work holder 4 has executed an intermittent rotation, the lower portion 29 of the incline being raised, the roller of the lever 37 stands opposite a cavity in the cam disk so that the rod 35 is suddenly advanced through the intermediary of the lever 37 and of the spring 38 to eject the work from the groove 5 of the work holder. The ejected work drops onto an incline 40 arranged at point A and is conveyed to a collecting receptacle. After the ejection of the work the rod 35 is positively withdrawn by the action of the cam disk 39 whereupon the portion 29 of the feeding incline is lowered and a fresh work supplied to the groove 5. The end of the feeding incline is arranged with regard to the work holder so that the work inserted into the groove 5 projects with its head and a short portion of its shaft from the front end of the work holder 4.

The blank which has just been inserted is brought by the rotation of the work holder 4 in the direction of the arrow y (Fig. 1) to the point B where the thread cutting takes place. At the point B tongs 41, known per se, are arranged coaxial to the work which is held in the groove which actually faces this point. The tongs are operated by a driving gear not shown and serve for rotating the blank into which the thread is to be cut (Figs. 1, 2 and 3). In order to introduce the work into the tongs 41 the work holder and clamp must be shifted the one with regard to the other.

According to the invention the tongs 41 are stationarily mounted and the movement for the introduction of the work into the tongs is carried out by the work holder 4. For this purpose the above mentioned axial displacement of the work holder is utilized which serves at the same time to disengage the work holder from feed rod 23 and to lock the same. At this axial forward movement the head end of the bolt projecting from the work holder 4 is pushed between the arms of the tongs 41 which are then closed. As the slit has not yet been cut into the head of the bolt the tongs can grip the work at the head end of the shaft and over the entire height of the head so that it is securely gripped and held. If the work is clamped on the tongs, the tongs draw the work along which is now rotated so that the thread is cut into the shaft of the bolt. A cutting tool 42 of convenient profile which serves for cutting the thread is mounted on a holder 43 which is oscillatable around an axle parallel to the axis of the work and at the same time shiftable in the longitudinal direction of the work (Figs. 1, 2 and 7, 8). In the form of construction, shown by way of example, the holder 43 is fixed upon a shaft 44 which is rotatable and shiftable in axial direction and which, on the one hand, can be rotated, through the intermediary of a lever 45 and of a cam disk 46, in order to press the cutter 42 against the work, and, on the other hand, can be shifted in longitudinal direction, through the intermediary of another lever and cam disk, which are not shown on the drawing, in order to move the tool along the shaft of the bolt. The amount of the longitudinal movement must be, as usual, in relation to the angular speed of the tongs 41 in accordance with the pitch of thread which is desired. At the thread cutting the shaft of the work remains in the groove 5 of the work holder 4 and the walls of this groove serve as abutments for intercepting the working pressure of the cutter tool 42. In order that the cutter tool 42 may be brought without impedient against the shaft of the bolt the lever 7 is lifted off the bolt. With this object in view a lever 48, having a wedge-shaped nose 47 at its free end, is fixed on the shaft 44 which carries the tool holder 43, said nose pressing on a finger 49, mounted on the control lever 10 for the clamping element 7, when the cutting tool 42 is advanced towards the shaft of the bolt, whereby the clamping element 7 is rotated so that it is lifted off the shaft of the bolt. The finger 49 must be of such length that the lever 48 which moves with the cutting tool 42 remains in engagement with the same during the thread cutting.

When the thread cutting has been finished the head of the work is pulled out of the tongs 41 which have been opened in the meantime. This pulling out is effected by the backward movement of the work holder 4 for releasing the locking of the work holder 4 and for coupling the feed disk 17 with the feed rod 23. The work holder 4 is then rotated again 90°. At this occasion the work into which the thread has been cut gets to the point C e. g. in front of a circular saw 50 and it is brought into the renewed forward range of this saw by the renewed forward movement of the work holder. The saw 50 is mounted on the one end of a shaft 51, the bearing 52 of which is carried by two arms 53, 53ª oscillatable around a shaft 54 which is parallel to 51, said arms being operated, through the intermediary of a pair of spur wheels 55, 55ª on the shafts 51 and 54 and a pair of bevel wheels 56, 56ª from a shaft 57. The arms 53, 53ª which carry the shaft bearing 52 is connected by a connecting rod 58 with a roller lever 59 the roller of which is pressed by a spring not shown on a cam disk 59ª mounted on the control shaft 16. This cam disk 59ª controls the arm 53 in such a manner that the saw 50, the work holder 4 being at stand still, is advanced towards the work held in the groove which faces the point 8, so that a slit is cut into the head of this work, whereupon the saw 50 moves away from the work. While the slit is cut into the head the shaft of the bolt must be positively clamped in the groove 5 of the work holder 4. With this object in view a rigid arm 61, fixed on a carriage 60 (Figs. 9 and 10) movable transversely to the shaft of the work holder, is pressed, prior to the beginning of the advancing movement of the saw, from the outer side on the clamping element 7 at point C, by the shifting of the carriage 60, so that this clamping element 7 is positively pressed on the shaft of the bolt. The shifting of the carriage 60 is effected through the intermediary of roller lever 62 from another cam disk 62ª mounted on the control shaft 16. A small plate 63 is further mounted on the arm 61 said plate having indentures 64 in its small end the edges of said indentures being bevelled in accordance with the cone-shape of the rear end face of the screw head. The ends of the plate 63, which is reversibly fixed on arm 61, form each a fork. The fork-shaped end which is in the working position grips, at the advancing of the carriage 60 towards the work holder 4, under the head of the screw bolt to support the head of this bolt in axial direction during the cutting of the slit. (Figs. 10 and 11). In this manner it is positively prevented that the work yields with regard to the saw 50 so that accurate and clean slits are cut.

Before the work holder 4 rotates again the carriage 60 is pulled back whereby the arm 61 with the plate 63 is pulled away from the work holder 4. After, as above described, the locking of the work holder 4 has been released by the backward movement of the work holder, and after at the same time the slit work has been withdrawn from the range of the circular saw 50 the rotation of the work holder takes place, the previously slit work being brought to the working point D where the turning off of the screw head takes place.

The device which serves for the turning off consists of a permanently rotating tool head (Figs. 12 to 15) which stands coaxial to the work which is positioned at point D. The tool head has essentially the shape of a sleeve 66 mounted on the free end of a hollow shaft 65, said sleeve 66 having at its front end a flange and at its rear end a spur wheel 67 serving to rotate the head. In the sleeve 66 tongs are arranged which are fixed by means of a screw pin 68, standing at right angles to the axis of the sleeve, in two diametrically opposite holes in the wall of the sleeve. The two claws 69, 70 of the tongs project from the sleeve 66, the arms 71, 72 being inwardly directed. The tongs are exposed to the action of two opening springs 73, located each one in a sleeve 74 on the claws and bearing at the one end against the bottom of the sleeve and at the other end against the opposite claw. A double-wedge shaped guide element 75 co-operating with the two shafts 71, 72 of the tongs and movable in longitudinal direction in the hollow shaft 65 serves for closing the tongs said guide element being operated, through the intermediary of a lever system co-operating with a cam disk mounted on the control shaft 16 of the machine. This lever mechanism and cam disk need not be shown as they are only one of numerous well known operating means which might be used for this purpose and does not form part of the invention.

The claw 69 serves as holder for a turning tool 76 which is of such a profile that it is capable to turn off simultaneously the front plane end face and the rear conical end face of the bolt head. In the other claw 70 a counter holder is arranged which is designed to intercept the working pressure at the turning off of the bolt head and which consists of a small removable plate 77 having on both end edges semicircular incisions 78. The incision of plate 77 which is directed towards the centre of the tool head grips around the bolt shaft directly underneath the bolt head and supports the same on the side opposite the point at which the turning tool 76 works.

During the rotation of the work holder 4 the claws 69, 70 of the tongs are open. At the forward movement of the work holder 4 which takes place after the rotation has been completed the head of the work which has just arrived at the point D is inserted between the two claws 69, 70 of the tongs whereupon the claws are closed through the intermediary of the wedge-shaped guide element 75. The two active edges 79, 80 of the guide element are of such shape that first the claw 70 which carries the counter holder is brought into the closed position so that the counter holder 77 is pressed on the work whereupon the other claw 69 is moved inward first of such an amount that the turning tool 76 comes in contact with the bolt head. The counter holder 77 remaining in its position the turning tool 76 is gradually advanced by the closing movement of claw 69 and it turns the screw head off on the front and rear end faces.

During this operation the shaft of the work must be securely held in the groove 5 of the work holder 4. With this object in view a second rigid arm 81 is fixed on the above mentioned carriage 60, the arm carrying at its upper end a clamping finger 82. At the advancing movement of the carriage 60 towards the holder 4 the finger 82 engages into the groove 5 and clamps the shaft of the screw bolt positively against the opposite wall of the groove so that the work can neither shift nor rotate. The spring controlled clamping lever 7 might also be positively pressed against the shaft of the bolt by the action of a nose on arm 81.

When the turning off of the screw head is finished the clamping finger 82 is pulled back from groove 5 by the backward movement of carriage 60 whereupon the work holder 4 is shifted backward in order that its locking might be released and the feed mechanism 17, 23 might be coupled. The head of the work which stands at point D is at the same time pulled out from between the claws 69, 70 of the tongs so that the work holder 4 is free to rotate. At this occasion the work the head of which has been turned off and which is therefore finished, is brought to the point A where it is ejected by the ejector 35, 36 from the work holder 4 which has been locked in position, a fresh work being subsequently inserted into said groove 5 in the manner described above.

The work holder 4 carries always 4 works at each part rotation. During the ejecting of a finished work at point A and the insertion of a fresh work, the thread is cut into another work at point B, the slit is cut at point C into the head of a bolt into which the thread has been cut, and at point D the turning off of the head of a fourth bolt is executed into which the thread has been cut the slit in said head having been cut at the previous operation. At the axial displacement of the work holder 4 which takes place subsequently to every part rotation the work at point B is inserted into the rotating tongs 41, the work at point C is brought into the range of the circular saw 50 and the work at point D is inserted between the counter holder 77 and the turning tool 76, whilst at every backward movement of the work holder which takes place prior to every part rotation the works are respectively pulled out of the tongs 41, removed from the range of the saw 50, and removed from between turning tool 76 and counter holder 77. The time during which the work holder 4 is at rest between two succeeding part rotations depends on that working phase which requires the longest time e. g. on the time necessary for the thread cutting. As more time than necessary is at disposal for the cutting of the slit and for the turning off of the head the circular saw 50 and the turning tool 76 can be advanced very slowly so that they take off very thin chips, these tools being thus protected against rapid wear.

At every complete rotation of the work holder 4 after the first one four screw bolts are finished so that after every part rotation of the work holder 4 a finished screw bolt is delivered.

The construction described is given by way of example only, modifications being possible within the limits of the invention. The work holder 4 might for instance be prismatic instead of cylindrical and it might have any other number of grooves than 4 in which case it must be intermittently rotated of another angle than 90°. Instead of the cutting tool 42 a rotating milling cutter of any other known type might be used for cutting the thread, this presenting the advantage that the milling cutter does not get blunt quite so rapidly as the cutting tool 42 so that the service has to be interrupted less frequently for exchanging the tools.

I claim:—

1. A machine for the production of wood screws from pressed blanks, comprising in combination a feeding device and a delivering device at the first working point of a circle, a thread cutting tool at the second working point of the circle, and rotating tongs at this second working point for gripping and rotating the corresponding work during the thread cutting, a circular saw for cutting the slit in the bolt head at a third working point of the circle, a tool head with cutting tools for turning off the head of the bolt at a fourth working point of the circle, means for rotating said tool head, a work holder in said circle said work holder having four axial grooves, means for securely holding a work in each groove, means for intermittently rotating said work holder to bring each groove successively from one working point to the other and for stopping said work holder after each part rotation in front of the grooves, and means for advancing said work holder after every part rotation to push the head of one work part into said rotating tongs to bring the head of another work into the range of the circular saw and to bring the head of another work into the range of said turning tools and for moving said work holder back prior to every part rotation.

2. A machine for the production of wood screws from pressed blanks, comprising in combination a feeding device and a delivering device at the first working point of a circle, a thread cutting tool at the second working point of the circle, and rotating tongs at this second working point for gripping and rotating the corresponding work during the thread cutting, a circular saw for cutting the slit in the bolt head at a third working point of the circle, a tool head with cutting tools for turning off the head of the bolt at a fourth working point of the circle, means for rotating said tool head, a work holder in said circle, said work holder having four axial grooves, means for securely holding a work in each groove, means for intermittently rotating said work holder to bring each groove successively from one working point to the other and for stopping said work holder after each part rotation in front of the grooves, means for advancing said work holder after every part rotation to push the head of one work into said rotating tongs to bring the head of another work into the range of the circular saw and to bring the head of another work into the range of said turning tools and for moving said work holder back prior to every part rotation, a spring controlled clamping element in each groove of said work holder for holding the shafts of the work in the grooves of the work holder, and control elements acting upon said clamping elements and operated in dependency on said tools for lifting said clamping elements off the work at the point where the thread cutting takes place and for positively pressing said clamping element on the shaft of the work at the points where the slit is cut into the head of the bolt and where said head is turned off.

3. A machine for the production of wood screws from pressed blanks, comprising in combination a feeding device and a delivering device at the first working point of a circle, a thread cutting tool at the second working point of the circle, and rotating tongs at this second working point for gripping and rotating the corresponding work during the thread cutting, a circular saw for cutting the slit in the bolt head at a third working point of the circle, a tool head with cutting tools for turning off the head of the bolt at a fourth working point of the circle, means for rotating said tool head, a work holder in said circle said work holder having four axial grooves, means for securely holding a work in each groove, means for intermittently rotating said work holder to bring each groove successively from one working point to the other and for stopping said work holder after each part rotation in front of the grooves, means for advancing said work holder after every part rotation to push the head of one work into said rotating tongs to bring the head of another work into the range of the circular saw and to bring the head of another work into the range of said turning tools for moving said work holder back prior to every part rotation, a spring controlled clamping element in each groove of said work holder for holding the shafts of the works in the grooves of the work holder, control elements acting upon said clamping elements and operated in dependency on said tools for lifting said clamping elements off the works at the point where the thread cutting takes place and for positively pressing said clamping elements on the shafts of the works at the points where the slit is cut into the head of the bolt and where said head is turned off, at the point where the turning off of the bolt head takes place, a second clamping element arranged outside the work holder, and means for pressing said second clamping element positively against the shaft of the corresponding bolt during the turning off of the bolt head.

4. A machine for the production of wood screws from pressed blanks, comprising in combination a feeding device and a delivering device at the first working point of a circle, a thread cutting tool at the second working point of the circle, and rotating tongs at this second working point for gripping and rotating the corresponding work during the thread cutting, a circular saw for cutting the slit in the bolt head at a third working point of the circle, a tool head with cutting tools for turning off the head of the bolt at a fourth working point of the circle, means for rotating said tool head, a work holder in said circle said work holder having four axial grooves, means for securely holding a work in each groove, means for intermittently rotating said work holder to bring each groove successively from one working point to the other and for stopping said work holder after each part rotation in front of the grooves, means for advancing said work holder after every part rotation to push the head of one work into said rotating tongs to bring the head of another work into the range of the circular saw and to bring the head of another work into the range of said turning tools and for moving said work holder back prior to every part rotation, a spring controlled clamping element in each groove of said work holder for holding the shaft of the work in the grooves of the work holders, control elements acting upon said clamping elements and operated in dependency on said tools for lifting said clamping elements off the work at the point where the thread cutting takes place and for positively pressing said clamping elements on the shafts of the works at the points where the slit is cut into the head of the bolt and where said head is turned off, a fork shaped element at the working point where the cutting of the slit in the head of the bolt takes place, and means for advancing said fork shaped element so that it grips under the head of the bolt which stands in front of said circular saw.

5. A machine for the production of wood screws from pressed blanks, comprising in combination a feeding device and a delivering device at the first working point of a circle, a thread cutting tool at the second working point of the circle, and rotating tongs at this second working point for gripping and rotating the corresponding work during the thead cutting, a circular saw for cutting the slit in the bolt head at a third working point of the circle, a tool head with cutting tools for turning off the head of the bolt at a fourth working point of the circle, means for rotating said tool head, a work holder in said circle said work holder having four axial grooves, means for securely holding a work in each groove, means for intermittently rotating said work holder to bring each groove successively from one working point to the other and for stopping said work holder after each part rotation in front of the grooves, means for advancing said work holder after every part rotation to push the head of one work into said rotating tongs to bring the head of another work into the range of the circular saw and to bring the head of another work into the range of said turning tools and for moving said work holder back prior to every part rotation, a spring controlled clamping element in each groove of said work holder for holding the shafts of the work in the grooves of the work holders, control elements acting upon said clamping elements and operated in dependency on said tools for lifting said clamping elements off the work at the point where the thread cutting takes place and for positively pressing said clamping elements on the shaft of the work at the point where the slit is cut into the head of the bolt and where said head is turned off, a fork shaped element fixed on the control element arranged in proximity to said circular saw for operating the clamping elements on the work holder, and means for advancing said fork shaped element so that it grips under the head of the bolt which stands in front of said circular saw.

6. A machine for the production of wood screws from pressed blanks, comprising in combination a feeding device and a delivering device at the first working point of a circle, a thread cutting tool at the second working point of the circle, and rotating tongs at this second working point for gripping and rotating the corresponding work during the thread cutting, a circular saw for cutting the slit in the bolt head at a third working point of the circle, a tool head with cutting tools for turning off the head of the bolt at a fourth working point of the circle, means for rotating said tool head, a work holder in said circle said work holder having four axial grooves, means for securely holding a work in each groove, means for intermittently rotating said work holder to bring each groove successively from one working point to the other and for stopping said work holder after each part rotation in front of the grooves, means for advancing said work holder after every part rotation to push the head of one work into said rotating tongs to bring the head of another work into the range of the circular saw and to bring the head of another work into the range of said turning tools and for moving said work holder back prior to every part rotation, a spring controlled clamping element in each groove of said work holder for holding the shafts of the work in the grooves of the work holder, control elements acting upon said clamping elements and operated in dependency on said tools for lifting said clamping elements off the work at the point where the thread cutting takes place and for positively pressing said clamping elements on the shaft of the work at the points where the slit is cut into the head of the bolt and where said head is turned off, a counter holder on said tool head rotating with the same and designed for supporting against the working pressure of the turning tool at the turning off of the head the end of the work which projects from the work holder, and means for bringing said counter holder into the working position when said turning tool is advanced.

7. A machine for the production of wood screws from pressed blanks, comprising in combination a feeding device and a delivering device at the first working point of a circle, a thread cutting tool at the second working point of the circle, and rotating tongs at this second working point for gripping and rotating the corresponding work during the thread cutting, a circular saw for cutting the slit in the bolt head at a third working point of the circle, a tool head with cutting tools for turning off the head of the bolt at a fourth working point of the circle, means for rotating said tool head, a work holder in said circle, said work holder having four axial grooves, means for securely holding a work in each groove, means for intermittently rotating said work holder to bring each groove successively from one working point to the other and for stopping said work holder after each part rotation in front of the grooves, means for advancing said work holder after every part rotation to push the head of one work into said rotating tongs to bring the head of another work into the range of the circular saw and to bring the head of another work into the range of said turning tools and for moving said work holder back prior to every part rotation, a spring controlled clamping element in each groove of said work holder for holding the shafts of the work in the grooves of the work holder, control elements acting upon said clamping elements and operated in dependency on said tools for lifting said clamping elements off the work at the point where the thread cutting takes place and for positively pressing said clamping elements on the shaft of the work at the points where the slit is cut into the head of the bolt and where said head is turned off, rotating tongs in said bolt head, a turning tool on one of the claws of said tongs a counter holder on the other claw of said tongs, springs for opening said claws of the tongs, a wedge-shaped guide element for closing said claws of the tongs, means for advancing said guide element in the direction of the axis of said tool head so that at the closing movement of the tongs first said counter holder is pressed on the end of the work which projects from the work holder to support said work against the working pressure of said turning tool which is advanced at the subsequent closing of the second claw of said tongs, a counter holder on said tool head rotating with the same and designed for supporting against the working pressure of the turning tool at the turning off of the head the end of the work which projects from the work holder, and means for bringing said counter holder into the working position when said turning tool is advanced.

8. A machine for the production of wood screws from pressed blanks comprising in combination a feeding mechanism, and a delivering mechanism at the first working point of a circle, a tool for cutting the thread at the second working point of the circle, a tool for cutting the slit in the head of the work at the third working point of the circle, a tool for turning off the head of the bolt at the fourth working point of the circle, a work holder in said circle having a number of axial grooves, corresponding with the number of working points on the circle, and means for intermittently rotating said work holder to bring the works successively from one working point to the other, said feeding mechanism consisting of an incline composed of an upper stationary part and of a lower part oscillatably mounted on said stationary part, means for lifting said oscillatable part of the incline when said work holder stops in front of the first working point, said delivering mechanism consisting of an ejector arranged parallel to the axis of said work holder, and of an incline designed to receive the delivered works, and means for operating said ejector when the work holder is stopped and said oscillatable part of the feeding incline is lifted.

9. A machine for the production of wood screws from pressed blanks comprising in combination a feeding mechanism, and a delivering mechanism at the first working point of a circle, a tool for cutting the thread at the second working point of the circle, a tool for cutting the slit in the head of the work at the third working point of the circle, a tool for turning off the head of the bolt at the fourth working point of the circle, a work holder in said circle having a number of axial grooves, corresponding with the number of working points on the circle, and means for intermittently rotating said work holder to bring the works successively from one working point to the other, said feeding mechanism consisting of an incline composed of an upper stationary part and of a lower part oscillatably mounted on said stationary part, means for lifting said oscillatable part of the incline when said work holder stops in front of the first working point, said delivering mechanism consisting of an ejector arranged parallel to the axis of said work holder and of an incline designed to receive the delivered works, means for operating said ejector when the work holder is stopped and said oscillatable part of the feeding incline is lifted, a pushing element at the feeding point, and means for moving said pusher to and fro in vertical direction so that when descending it engages with said oscillatable part of the feeding incline and pushes the blank into the groove of said work holder which faces the feeding point.

10. A machine for the production of wood screws from pressed blanks, comprising in combination a feeding device and a delivering device at the first working point of a circle, a thread cutting tool at the second working point of the circle, and rotating tongs at this second working point for gripping and rotating the corresponding work during the thread cutting, a circular saw for cutting the slit in the bolt head at a third working point of the circle, a tool head with cutting tools for turning off the head of the bolt at a fourth working point of the circle, means for rotating said tool head, a work holder in said circle said work holder having four axial grooves, means for securely holding a work in each groove, means for intermittently rotating said work holder to bring each groove successively from one working point to the other and for stopping said work holder after each part rotation in front of the grooves, means for advancing said work holder after every part rotation to push the head of one work into said rotating tongs to bring the head of another work into the range of the circular saw and to bring the head of another work into the range of said turning tools and for moving said work holder back prior to every part rotation, a feeding mechanism for intermittently rotating said work holder, and a locking mechanism for locking said work holder when the same is stopped said locking mechanism being operated by the axial displacement of said work holder and at the same time coupled with said feeding mechanism.

11. A machine for the production of wood screws from pressed blanks, comprising in combination a feeding device and a delivering device at the first working point of a circle, a thread cutting tool at the second working point of the circle, and rotating tongs at this second working point for gripping and rotating the corresponding work during the thread cutting, a circular saw for cutting the slit in the bolt head at a third working point of the circle, a tool head with cutting tools for turning off the head of the bolt at a fourth working point of the circle, means for rotating said tool head, a work holder in said circle said work holder having four axial grooves, means for securely holding a work in each groove, means for intermittently rotating said work holder to bring each groove successively from one working point to the other and for stopping said work holder after each rotation in front of the grooves, means for advancing said work holder after every part rotation to push the head of one work into said rotating tongs to bring the head of another work into the range of the circular saw and to bring the head of another work into the range of said turning tools and for moving said work holder back prior to every part rotation, a shaft of said work holder, a bearing for said shaft said bearing having notches, a cam disk on said shaft said cam disk having in one end face a number of holes arranged on a circle, locking cams on said disk adapted to engage with one of said notches of the bearing when said work holder is in advanced position, a feed rod operated from said work holder when the same moves back, and a feed cam on said rod designed to engage with one of said holes of said cam disk.

12. A machine for the production of wood screws from pressed blanks, comprising in combination a feeding device and a delivering device at the first working point of a circle, a thread cutting tool at the second working point of the circle, and rotating tongs at this second working point for gripping and rotating the corresponding work during the thread cutting, a circular saw for cutting the slit in the bolt head at a third working point of the circle, a tool head with cutting tools for turning off the head of the bolt at a fourth working point of the circle, means for rotating said tool head, a work holder in said circle said work holder having four axial grooves, means for securely holding a work in each groove, means for intermittently rotating said work holder to bring each groove successively from one working point to the other and for stopping said work holder after each rotation in front of the grooves, means for advancing said work holder after every part rotation to push the head of one work into said rotating tongs to bring the head of another work into the range of the circular saw and to bring the head of another work into the range of said turning tools and for moving said work holder back prior to every part rotation, a shaft of said work holder, a bearing for said shaft said bearing having notches, a cam disk on said shaft said cam disk having in one end face a number of holes arranged on a circle, locking cams on said disk adapted to engage with one of said notches of the bearing when said work holder is in advanced position, a feed rod operated from said work holder when the same moves back, a feed cam on said rod designed to engage with one of said holes of said cam disk, and two links for guiding said feed rod the length of said links being equal to the radius of the circle of holes in the cam disk.

In testimony whereof I affix my signature.

GUSTAV WEBER.